(12) United States Patent
Levine et al.

(10) Patent No.: US 10,947,052 B2
(45) Date of Patent: Mar. 16, 2021

(54) CONVEYOR SYSTEM GEARMOTOR WITH DIRECT ROLLER CONNECTION

(71) Applicant: Nidec Motor Corporation, St. Louis, MO (US)

(72) Inventors: Gregory M. Levine, Frontenanc, MO (US); Edward V. Minnich, Grayslake, IL (US); Andrew Helgeland, Lake in the Hills, IL (US); Jaroslaw Sterna, Deer Park, IL (US)

(73) Assignee: Nidec Motor Corporation, St. Louis, MO (US)

( * ) Notice: Subject to any disclaimer, the term of this patent is extended or adjusted under 35 U.S.C. 154(b) by 33 days.

(21) Appl. No.: 16/414,510

(22) Filed: May 16, 2019

(65) Prior Publication Data

US 2019/0352098 A1 Nov. 21, 2019

Related U.S. Application Data (60) Provisional application No. 62/672,333, filed on May 16, 2018.

(51) Int. Cl.
| | |
|---|---|
| *B65G 23/24* | (2006.01) |
| *B65G 13/06* | (2006.01) |
| *F16H 1/20* | (2006.01) |
| *F16H 57/025* | (2012.01) |
| *H02K 7/08* | (2006.01) |
| *H02K 7/116* | (2006.01) |
| *H02K 5/15* | (2006.01) |
| *F16H 57/02* | (2012.01) |

(52) U.S. Cl.
CPC .............. *B65G 23/24* (2013.01); *F16H 1/20* (2013.01); *F16H 57/025* (2013.01); *H02K 5/15* (2013.01); *H02K 7/083* (2013.01); *H02K 7/116* (2013.01); *F16H 2057/02034* (2013.01)

(58) Field of Classification Search
CPC ...... B65G 13/06; B65G 23/24; B65G 13/071; F16H 1/20; F16H 57/0025; H02K 5/15; H02K 7/083; H02K 7/116
USPC .................................... 198/780, 781.07, 835
See application file for complete search history.

(56) References Cited

U.S. PATENT DOCUMENTS

| | | | | |
|---|---|---|---|---|
| 5,485,911 A | * | 1/1996 | Kettelson | B65G 13/06 198/781.02 |
| 5,881,342 A | * | 3/1999 | Makino | F16D 3/00 399/167 |
| 6,460,690 B1 | * | 10/2002 | Tachibana | B65G 13/04 198/791 |
| 7,261,201 B2 | * | 8/2007 | Tachibana | B65G 13/07 198/791 |
| 7,882,945 B2 | * | 2/2011 | Willi | B65G 47/263 198/791 |

(Continued)

*Primary Examiner* — Douglas A Hess
(74) *Attorney, Agent, or Firm* — Hovey Williams LLP (57) ABSTRACT

A gearmotor assembly for use with a conveyor system has a rotatable conveyor roller extending laterally between spaced conveyor side rails. The gearmotor assembly includes an electric motor with a rotatable motor output shaft. The gearmotor assembly further includes a gear train drivingly connected to the motor output shaft. The gear train includes a train output shaft axially offset from the motor output shaft, with the train output shaft being drivingly connectable to the conveyor roller, so that rotation of the motor output shaft produces corresponding rotation of the conveyor roller.

17 Claims, 10 Drawing Sheets

(56) References Cited

U.S. PATENT DOCUMENTS

| | | | | |
|---|---|---|---|---|
| 8,290,403 | B2 * | 10/2012 | Ueno | H02K 5/24 |
| | | | | 399/210 |
| 8,416,475 | B2 * | 4/2013 | Aoki | H04N 1/00732 |
| | | | | 358/498 |
| 8,453,829 | B1 * | 6/2013 | Kim | H01L 21/67721 |
| | | | | 198/791 |
| 8,464,863 | B2 * | 6/2013 | Pierret | F16C 13/02 |
| | | | | 198/835 |
| 8,602,207 | B2 * | 12/2013 | Chang | B65G 37/005 |
| | | | | 198/586 |
| 9,371,186 | B2 * | 6/2016 | Kiener | F16D 7/007 |

* cited by examiner

CONVEYOR SYSTEM GEARMOTOR WITH DIRECT ROLLER CONNECTION

CROSS-REFERENCE TO RELATED APPLICATIONS

This application claims the benefit of U.S. Provisional Application Ser. No. 62/672,333, filed May 16, 2018, entitled CONVEYOR SYSTEM GEARMOTOR WITH DIRECT ROLLER CONNECTION, which is hereby incorporated in its entirety by reference herein.

BACKGROUND

1. Field

The present invention relates generally to material handling systems and conveyor systems. Embodiments of the present invention concern a gearmotor assembly for use in a conveyor system to drive a conveyor roller.

2. Discussion of Prior Art

Conveyor systems with motor-driven conveyor rollers are generally known in the materials handling industry and are commonly used for distributing goods in a commercial workspace. Some known conveyor systems provide powered rollers by incorporating a motor within the roller itself. Other known systems provide driving power to a roller by connecting an external motor to the roller with a belt-and-pulley transmission.

However, conventional conveyor systems have numerous deficiencies. For instance, known motorized rollers require numerous different SKUs and roller lengths to handle a suitable range of packages. Prior art motorized rollers also have limited torque density and speed ranges. Furthermore, motorized rollers are relatively expensive and are available in only limited supplies, particularly due to the dramatic increase of global ecommerce and the demand for accumulation conveyors.

SUMMARY

The following brief summary is provided to indicate the nature of the subject matter disclosed herein. While certain aspects of the present invention are described below, the summary is not intended to limit the scope of the present invention.

Embodiments of the present invention provide a conveyor system and gearmotor assembly that does not suffer from the problems and limitations of the prior art conveyor systems set forth above.

A first aspect of the present invention concerns a gearmotor assembly for use with a conveyor system having a rotatable conveyor roller extending laterally between spaced conveyor side rails. The gearmotor assembly broadly includes an electric motor with a rotatable motor output shaft. The gearmotor assembly further includes a gear train drivingly connected to the motor output shaft. The gear train includes a train output shaft axially offset from the motor output shaft, with the train output shaft being drivingly connectable to the conveyor roller, so that rotation of the motor output shaft produces corresponding rotation of the conveyor roller.

A second aspect of the present invention concerns a conveyor system configured to advance an item along a longitudinal path. The conveyor system broadly includes a pair of spaced conveyor side rails, a conveyor roller, and a gearmotor assembly. The conveyor side rails extend along opposite sides of the longitudinal path. The conveyor roller extends laterally between the conveyor side rails to support the item during advancement. The gearmotor assembly includes an electric motor with a rotatable motor output shaft. The gearmotor assembly also includes a gear train drivingly connected to the motor output shaft. The gear train includes a train output shaft axially offset from the motor output shaft, with the train output shaft being drivingly connected to the conveyor roller, so that rotation of the motor output shaft produces corresponding rotation of the conveyor roller.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Turning to FIGS. 1-4, a conveyor system 20 is configured to advance various items, such as packages (not shown), along a longitudinal conveyor path P. As will be described in greater detail, the conveyor system 20 includes a series of conveyor rollers 22 spaced along the path P to support a package (not shown) and to drive the package in a forward direction along the path P.

Packages, materials, and other items suitable for advancement by the system 20 may include a wide variety of containers, such as, but not limited to, boxes, envelopes, mailers, tubes, cartons, bags, tubs, totes, cans, drums, and crates. Such packages may be constructed from many materials, such as paper, wood, a synthetic resin material, and/or metallic materials (e.g., carbon steel or aluminum). It will be appreciated that transported items may contain a wide range of goods. The conveyor system 20 may also be used to move individual (unpackaged) items, such as goods, bulk material, etc.

The depicted conveyor system 20 preferably includes the conveyor rollers 22, a pair of spaced conveyor side rails 24a,b, and one or more gearmotor assemblies 26. As will be explained, each gearmotor assembly 26 is configured to drive a corresponding one of the conveyor rollers 22.

Conveyor Side Rails and Conveyor Rollers

In the usual manner, the conveyor side rails 24a,b are operable to rotatably support conveyor rollers 22 and permit selective roller rotation. Preferably, the depicted conveyor side rails 24 each comprise a metallic beam 28 presenting an internal channel 28a, and the beam 28 is formed of a carbon steel material (although the beam could be formed of another metallic material, such as aluminum or stainless steel, and/or nonmetallic materials, such as a synthetic resin material).

Figure 2:
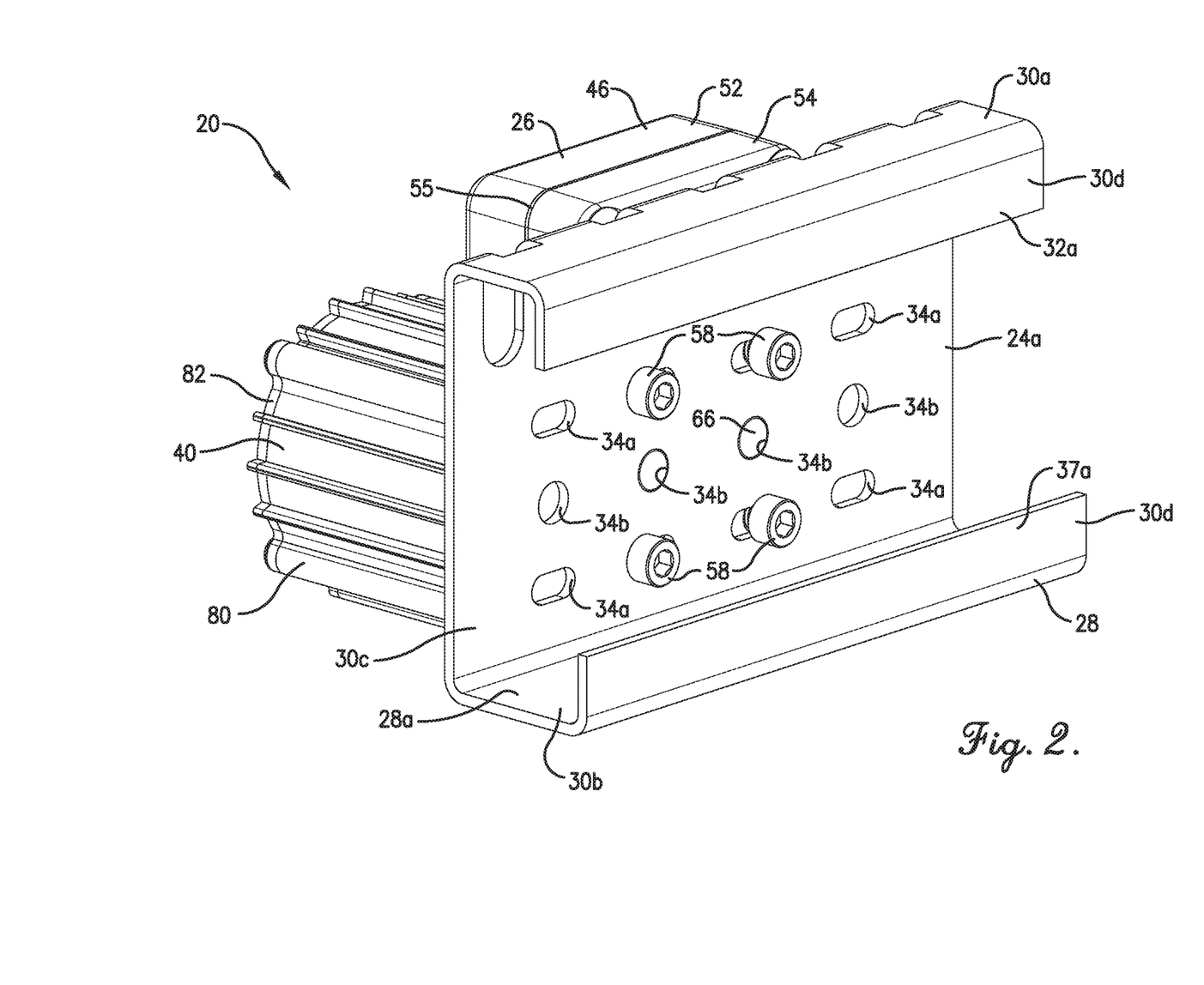
FIG. 2 is a fragmentary upper side perspective of the conveyor system shown in FIG. 1, showing one of the gearmotor assemblies mounted to one of the conveyor side rails.

Each conveyor side rail 24a,b includes a top wall 30a, bottom wall 30b, inboard wall 30c, and outboard walls 30d (see FIG. 2). The inboard wall 30c and outboard wall 30d present corresponding inboard and outboard surfaces 31a,b (see FIGS. 3 and 4). The conveyor side rail 24a,b also presents a series of roller slots 32 (see FIG. 4) along the top wall 30a and side openings 34a,b (see FIG. 2) extending through the inboard wall 30c. It is also within the scope of the present invention where one or both of the conveyor side rails has an alternative construction.

As is customary, the conveyor side rails 24a,b are configured to be supported by legs or stanchions (not shown) in a position spaced above a floor (not shown). In the illustrated embodiment, the conveyor side rails 24a,b extend along opposite sides of the longitudinal conveyor path P. Preferably, the conveyor path P is generally straight (i.e., linear). However, it is within the scope of the present invention where the side rails are curved (vertically and/or horizontally) to provide a curved conveyor path.

Each conveyor roller 22 extends laterally between the conveyor side rails 24a,b to support an item during advancement. The conveyor roller 22 is conventional and includes a roller body 36 and roller shafts 38a,b located at opposite ends of the conveyor roller 22 (see FIG. 1). The roller shaft 38b is rotatably received by one of the roller slots 32 in the conveyor side rail 24b.

The roller shaft 38a comprises a roller drive shaft that is drivingly attached to the gearmotor assembly. The depicted roller shaft 38a preferably has a hexagonal cross-sectional shape. However, the roller shaft 38a could have various cross-sectional shapes (such as other polygonal shapes, e.g., triangular, square, or octagonal) operable for transmitting torque within the scope of the present invention. The roller shaft could also have any of various splined cross-sectional shapes, which may or may not be polygonal. The roller shaft 38a and an opening in the output shaft of the gearmotor assembly 26 are preferably complementally shaped for driving interengagement. As will be described, the roller shaft 38a, and the corresponding end of the conveyor roller 22, are supported on the conveyor side rail 24a by the gearmotor assembly 26.

Gearmotor Assembly

Turning to FIGS. 4-8, the gearmotor assembly 26 is configured for use with the conveyor system 20 to drive a respective conveyor roller 22. More preferably, as will be explained, the gearmotor assembly 26 is directly coupled to and supports the conveyor roller 22. Although one gearmotor assembly 26 is depicted, it will be understood that the conveyor system 20 includes multiple gearmotor assemblies 26 associated with respective conveyor rollers 22. The gearmotor assembly 26 broadly includes a gearmotor housing 40, an electric motor 42, and a gear train 44 (see FIGS. 5-7).

The gearmotor housing 40 preferably operably supports the electric motor 42 and the gear train 44. In the illustrated embodiment, the gearmotor housing 40 includes an enclosed gear train case 46 and a motor housing 48.

The gear train case 46 presents a case chamber 50 to operably receive the gear train 44. In the depicted embodiment, the gear train case 46 includes inboard and outboard case sections 52,54, an endless gasket 55 located between the case sections 52,54, case fasteners 56, and mounting fasteners 58 (see FIGS. 2, 3, and 5).

Figure 4:
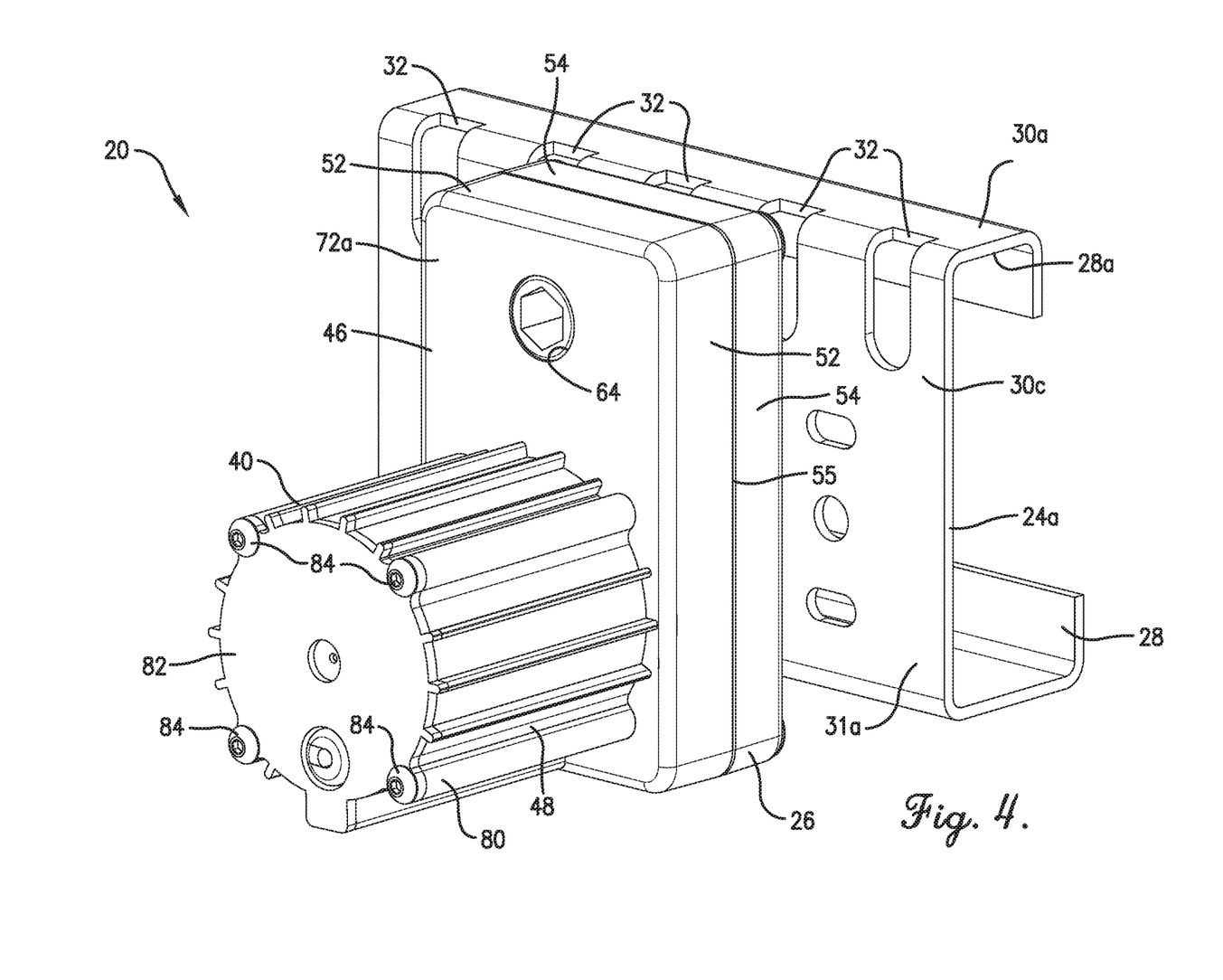
FIG. 4 is a fragmentary upper side perspective of the conveyor system similar to FIG. 2, but taken from the opposite side.
Figure 5:
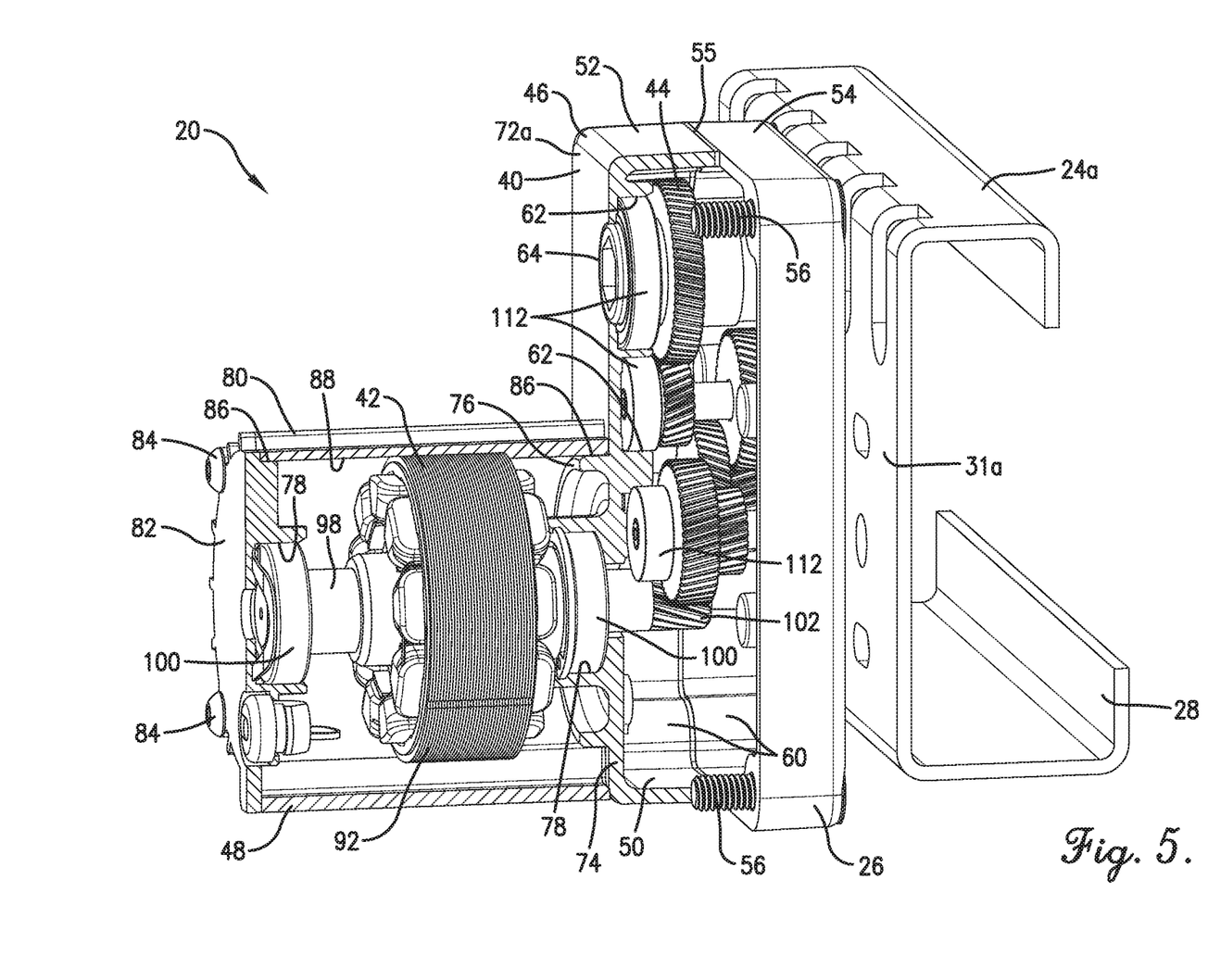
FIG. 5 is a fragmentary front perspective of the conveyor system shown in FIGS. 1-4, with the gearmotor housing including inboard and outboard case sections and a motor housing, showing the inboard case section and motor housing cross sectioned to depict an electric motor and a gear train of the gearmotor assembly.
Figure 6:
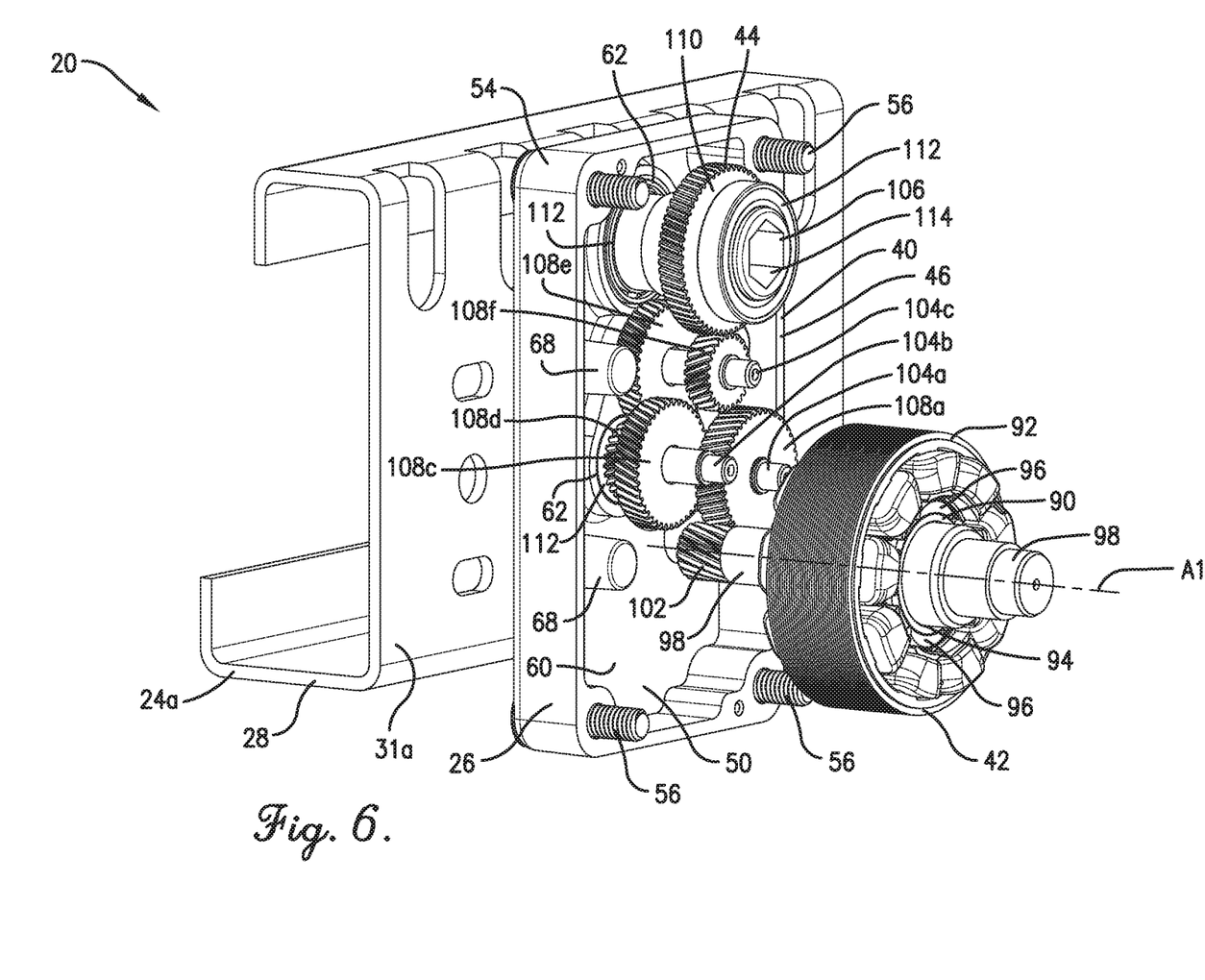
FIG. 6 is a fragmentary rear perspective of the conveyor system shown in FIGS. 1-5, showing the inboard case section and the motor housing removed to depict the electric motor and the gear train.

The inboard and outboard case sections 52,54 each present internal case surfaces 60 that form internal bearing pockets 62 to receive bearings of the gear train 44 (see FIGS. 5 and 6). Also, the case sections 52,54 each present shaft openings 64 that are generally aligned with one another to rotatably receive the output shaft of the gear train 44 (see FIGS. 3-5).

Figure 3:
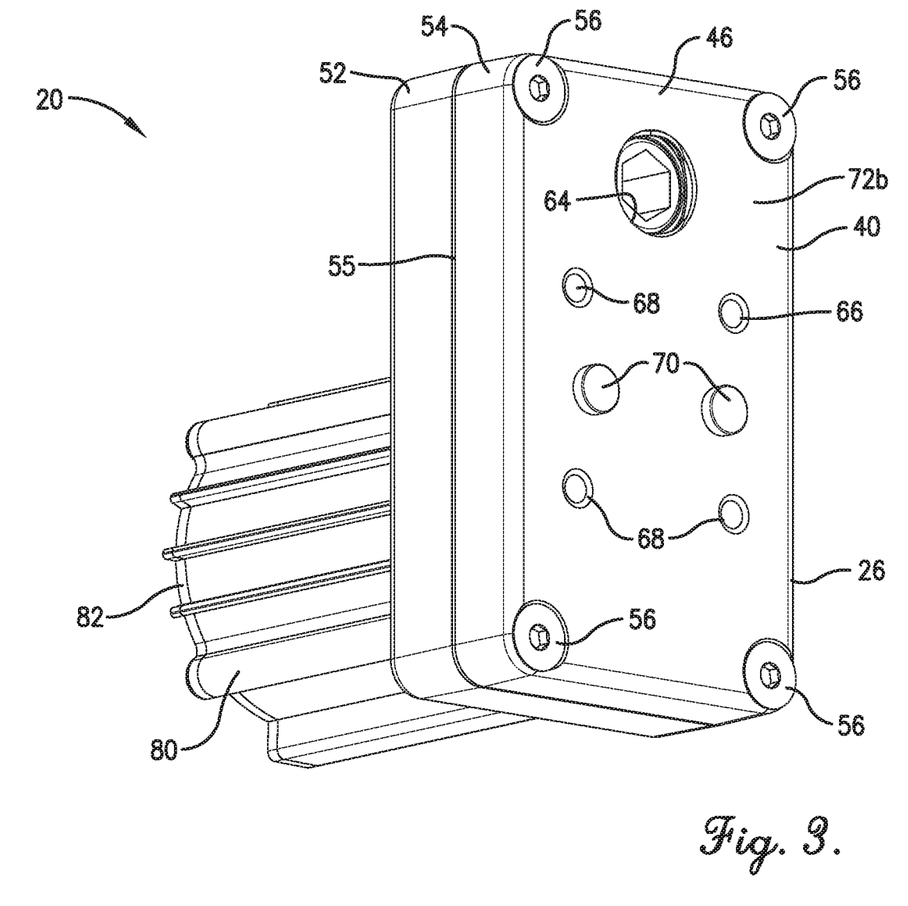
FIG. 3 is a fragmentary lower side perspective of the conveyor system similar to FIG. 2, but with the conveyor side rail removed.

The outboard case section 54 preferably provides a case connection structure 66 that includes fastener bosses 68 and locating bosses 70 (see FIGS. 2, 3, and 6). The fastener bosses 68 comprise threaded fastener elements that are internally threaded to receive the mounting fasteners 58.

Figure 1:
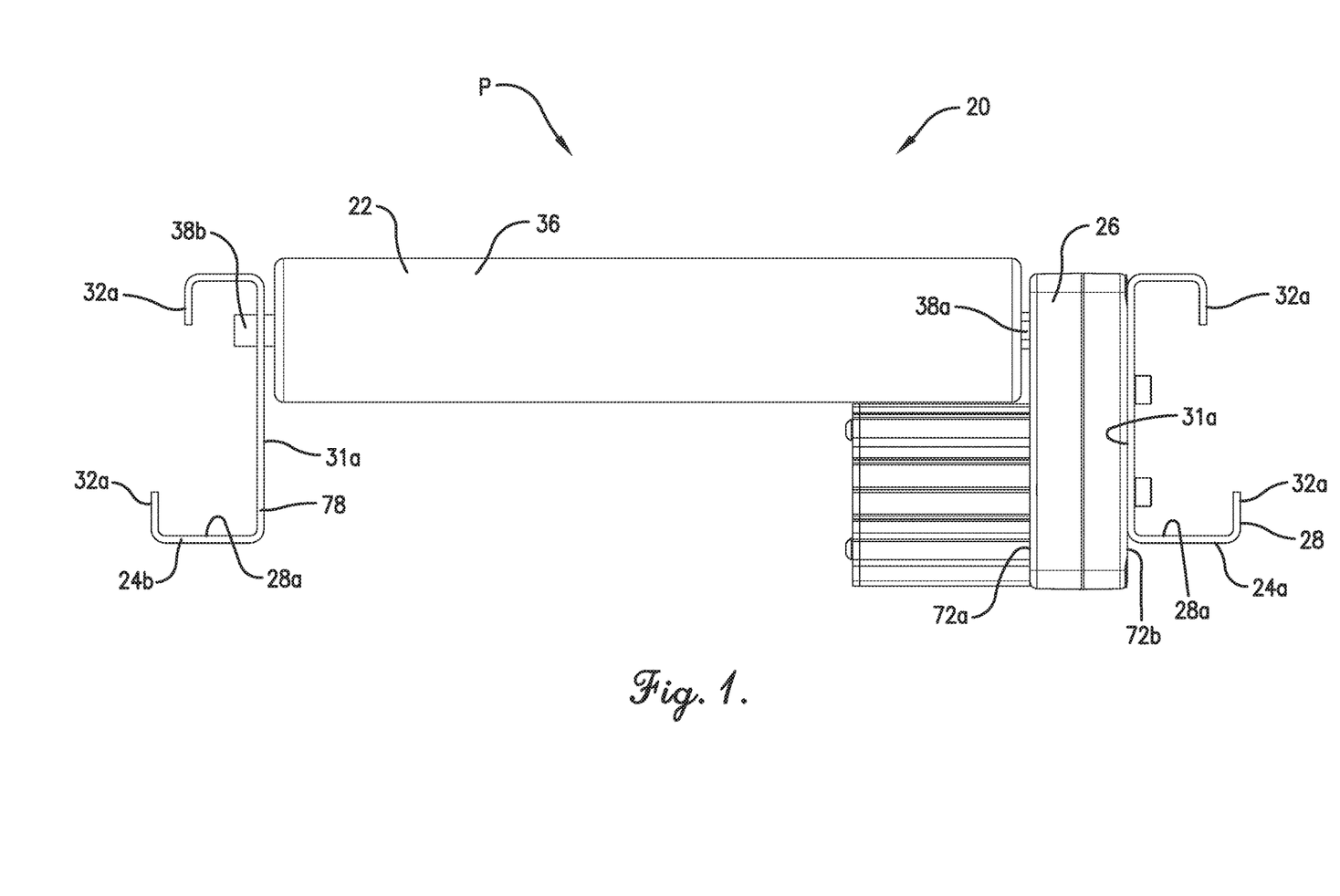
FIG. 1 is a front elevation view of a conveyor system constructed in accordance with a preferred embodiment of the present invention, where the conveyor system includes a pair of spaced conveyor side rails, conveyor rollers extending between the conveyor side rails, and gearmotor assemblies.

The inboard and outboard case sections 52,54 also present an external inboard surface 72a and an external outboard surface 72b, respectively (see FIGS. 1, 3, and 4). The locating bosses 70 project from the external outboard surface 72 (see FIG. 3) of the outboard case section 54 and are configured to be positioned in engagement with respective side openings 34.

Preferably, the inboard case section 52 further includes an external motor endshield 74. In the depicted embodiment, the motor endshield 74 is integrally formed as part of the inboard case section 52 and is operable to support the electric motor 42 and the motor housing 48 (see FIG. 5). The motor endshield 74 includes a circumferential lip 76 that projects inboard from the inboard surface 72a to receive the motor housing 48 (see FIG. 5). The motor endshield 74 also presents a bearing pocket 78 to receive a motor bearing (see FIG. 5).

The inboard and outboard case sections 52,54 are removably secured to one another by the case fasteners 56, with the gasket 55 positioned between the case sections 52,54. In this manner, the case sections 52,54 cooperatively define the chamber 50.

As will be discussed, the gearmotor housing 40 is preferably mounted on the inboard wall 30c of the conveyor side rail 24a. Preferably, when the gearmotor housing 40 is installed, the inboard and outboard case sections 52,54 are proximal and distal to the conveyor roller 22, respectively.

The motor housing 48 preferably includes a shell 80, a motor endshield 82, and fasteners 84 (see FIGS. 4 and 5). Again, the inboard case section 52 provides the motor endshield 74 for the electric motor 42. The motor endshield 82 and the lip 76 of the motor endshield 74 present circumferential shoulders 86 that slidably receive and support respective ends of the shell 80 (see FIG. 5). The shell 80 and motor endshields 74,82 cooperatively present an internal motor chamber 88 that at least substantially receives the stator and rotor of the electric motor 42 (see FIG. 5).

The endshields 74,82 preferably present respective bearing pockets 78 that support the motor bearings (see FIG. 5). The depicted endshield 82 and shell 80 are secured to the inboard case section 52 by the fasteners 84. However, it is within the ambit of certain aspects of the present invention where the motor housing has an alternative shell and/or alternative endshields. Furthermore, the shell and endshields could be alternatively secured to one another.

Figure 7:
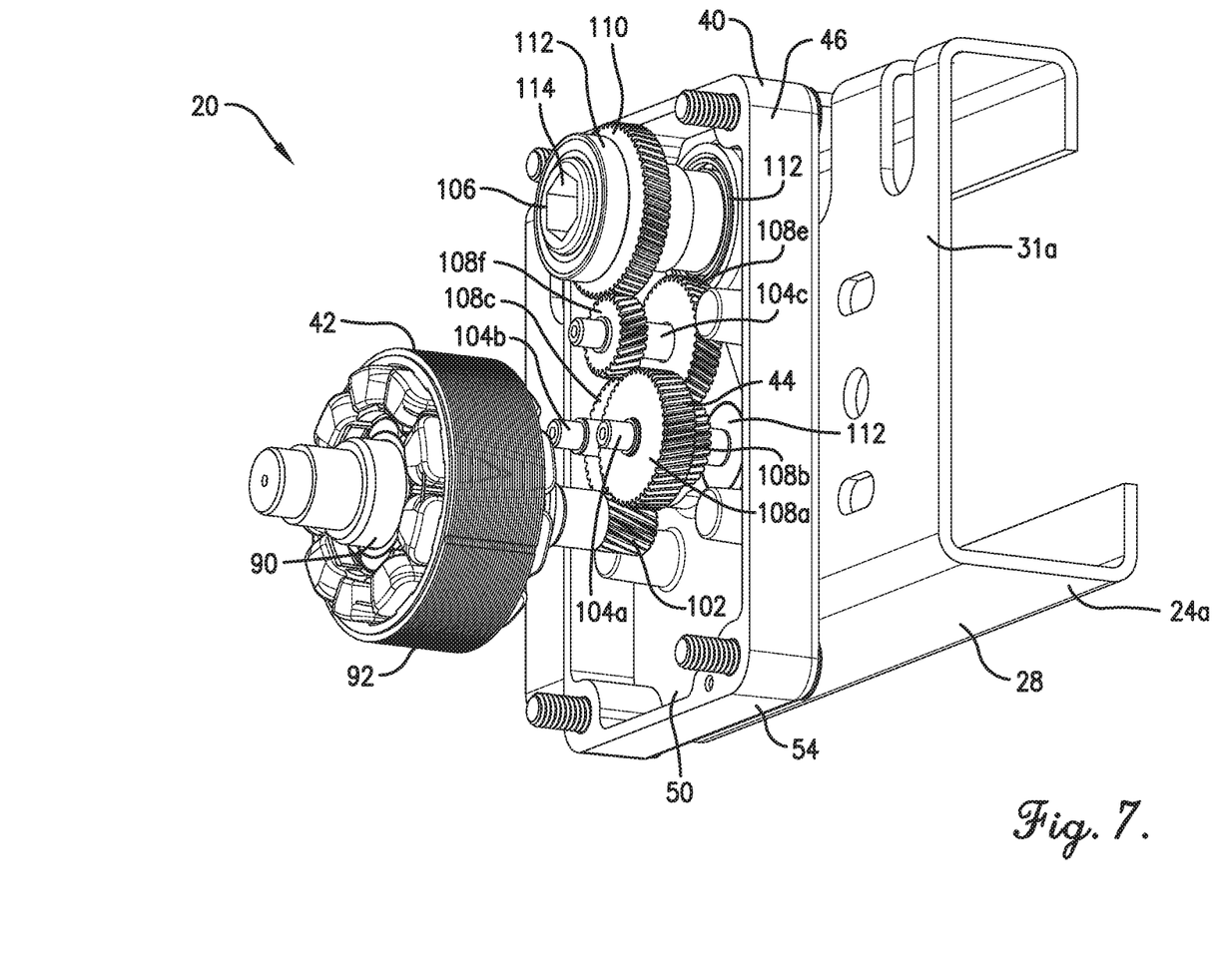
FIG. 7 is a fragmentary front perspective of the conveyor system similar to FIG. 6, but taken from the opposite side.
Figure 8:
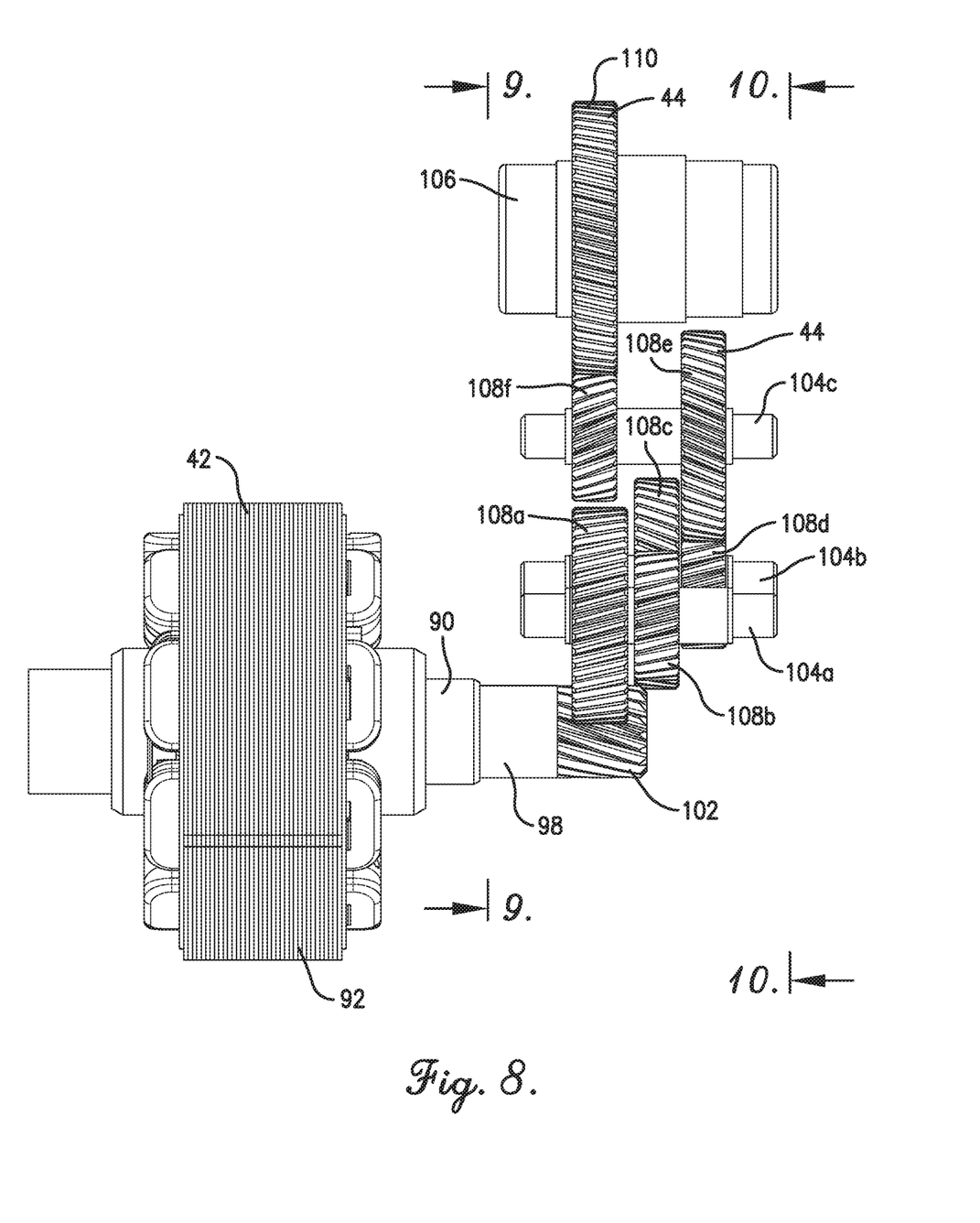
FIG. 8 is a fragmentary front elevation of the gearmotor assembly shown in FIGS. 5-7, showing the electric motor and gear train alone (with the gearmotor housing removed), showing a drive gear associated with the rotor in driving engagement with the gear train.
Figure 9:
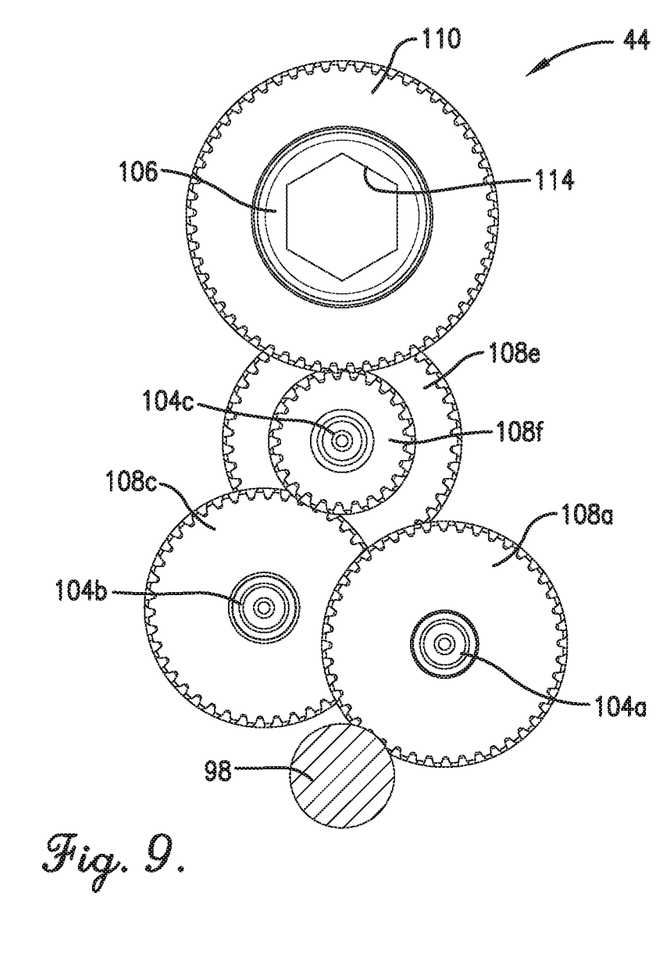
FIG. 9 is a cross section of the gearmotor assembly taken along line 9-9 in FIG. 8, with the gear train including a train driven gear mounted on a train output shaft and train intermediate gears mounted on train intermediate shafts, and showing the drive gear and gears of the gear train forming respective pairs of intermeshing gears.

The electric motor 42 is configured for use in any suitable environment and broadly includes a rotor 90 and a stator 92 operably supported in the motor housing 48 (see FIGS. 5-7). The rotor 90 is preferably rotatable about a motor axis A1 (see FIG. 6). In preferred embodiments, the stator 92 at least substantially circumscribes the rotor 90, such that the motor 42 is an inner rotor motor. It is permissible according to some aspects of the present invention, however, for the motor to be an outer rotor motor.

The rotor 90 preferably includes a rotor core 94, a plurality of magnets 96, and a motor shaft 98 defining the axis A1 for the rotor 90 (see FIG. 6). The rotor core 94 and magnets 96 are generally located within the motor housing 48. The motor shaft 98 is rotatably supported relative to the motor housing 48 to rotate about the axis A1. More specifically, the motor shaft 98 is rotatably supported by opposite motor bearings 100 (see FIG. 5) of the electric motor 42.

The motor bearings 100 preferably comprise ball bearings but could include other types of bearings (e.g., roller bearings or journal bearings) consistent with the principles of the present invention.

The electric motor 42 preferably comprises 42 a 50-watt, brushless DC electric motor. Although this electric motor is preferred, it is within the ambit of the present invention for the gearmotor assembly to include an alternative electric motor (e.g., an alternative DC electric motor).

The motor shaft 98 preferably provides a drive gear 102 that is located outside of the motor housing 48 and drivingly engages the gear train 44 (see FIGS. 5-8). In the illustrated embodiment, the drive gear 102 is preferably formed integrally with a free end of the motor shaft 98 and is spaced from the motor housing 48 (see FIG. 5). However, for some aspects of the present invention, the motor shaft could have a drive gear alternatively located along the length of the shaft. Furthermore, the shaft could have a drive gear mounted thereon. For some aspects of the present invention, the shaft could be drivingly connected to the gear train by structure other than a drive gear (e.g. a sprocket-and-chain drive).

Preferably, the motor shaft 98 of the rotor 90 defines the output shaft of the electric motor 42, which is drivingly connected to the gear train 44. It will be appreciated, however, that certain aspects of the present invention contemplate the motor output shaft not being the rotor shaft. For example, the electric motor may alternatively be provided with a transmission (e.g., a gear drive) between the rotor shaft and output shaft, with the shafts being drivingly connected but otherwise discrete and spaced apart.

In use, the electric motor 42 is operably coupled to a power supply (not shown). The electric motor 42 is selectively powered to rotate the shaft 98 and the drive gear 102 and to thereby power the gear train 44 and the conveyor roller 22.

Turning to FIGS. 6-12, the gear train 44 is drivingly connected to the motor shaft 98 and the conveyor roller 22. In this manner, the gear train 44 is operable to transmit power from the electric motor 42 to the conveyor roller 22, with rotation of the motor shaft 98 producing corresponding rotation of the conveyor roller 22. Preferably, the gear train 44 provides a gear ratio to reduce the output shaft speed and increase the output torque of the gearmotor assembly 26. The gear train 44 preferably includes train intermediate shafts 104a,b,c, train output shaft 106, train intermediate gears 108a,b,c,d,e,f, train driven gear 110, and train bearings 112.

The train output shaft 106 and the train driven gear 110 are configured for gear train operation to transmit power from the rest of the gear train 44 to the conveyor roller 22.

The train output shaft 106 is unitary and preferably receives and supports the train driven gear 110 for rotation therewith about a shaft axis A2. The depicted train output shaft 106 presents a shaft opening 114 (see FIGS. 9-12) that extends continuously through the train output shaft 106 and forms a hexagonal cross-sectional profile. The polygonal shape serves to rotationally fix the roller shaft 38a to the output shaft 106 and thereby transmits driving torque.

Also, the shaft opening 114 could have various cross-sectional shapes (such as other polygonal shapes, e.g., triangular, square, or octagonal) operable for transmitting torque within the scope of the present invention. The shaft opening could also have any of various splined cross-sectional shapes, which may or may not be polygonal. In such alternative embodiments, the roller shaft and the output shaft are preferably complementally shaped so that the roller shaft and the output shaft are rotationally fixed to one another and transmit driving torque. For certain aspects of the present invention, the roller shaft and output shaft could be otherwise rotationally fixed to one another (e.g., where the roller shaft and output shaft comprise circular shafts that are clamped to one another).

In the depicted embodiment, the train output shaft 106 is drivingly connected directly to the conveyor roller 22 so that the train output shaft 106 and the conveyor roller 22 rotate with one another. The roller shaft 38*a* extends into and out of the gearmotor housing 40 for attachment to the train output shaft 106 (see FIG. 1). In particular, the roller shaft 38*a* and the shaft opening 114 of the output shaft 106 are preferably complementally shaped, and the train output shaft 106 slidably receives the roller shaft 38*a*. When drivingly engaged, the shafts 38*a*, 106 are rotationally fixed so as to be rotatable with one another about the shaft axis A2.

It is also within the ambit of the present invention where the gear train and the conveyor roller are alternatively drivingly connected to one another. For instance, although the the output shaft 106 receives the roller shaft 38*a*, the train output shaft could be configured to extend into a complemental opening of the conveyor roller to drivingly engage the conveyor roller. Various other direct driving connections between the train output shaft and the conveyor roller are contemplated within the scope of the present invention. Additionally, for certain aspects of the present invention, the train output shaft and the conveyor roller could be drivingly connected by an intermediate drive structure or drive mechanism.

Figure 10:
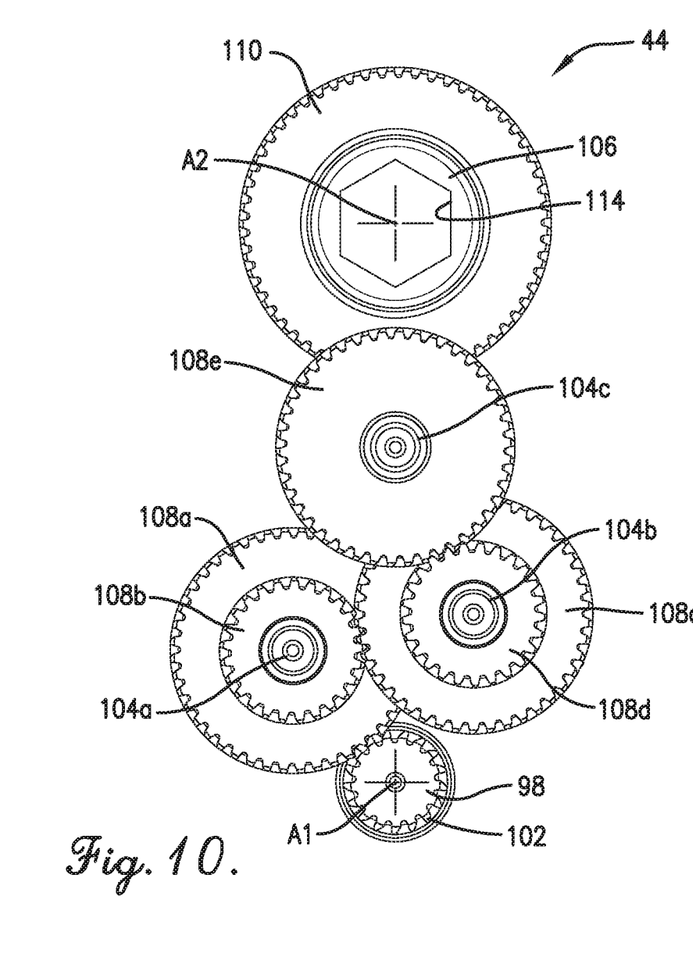
FIG. 10 is a cross section of the gearmotor assembly taken along line 10-10 in FIG. 8.
Figure 11:
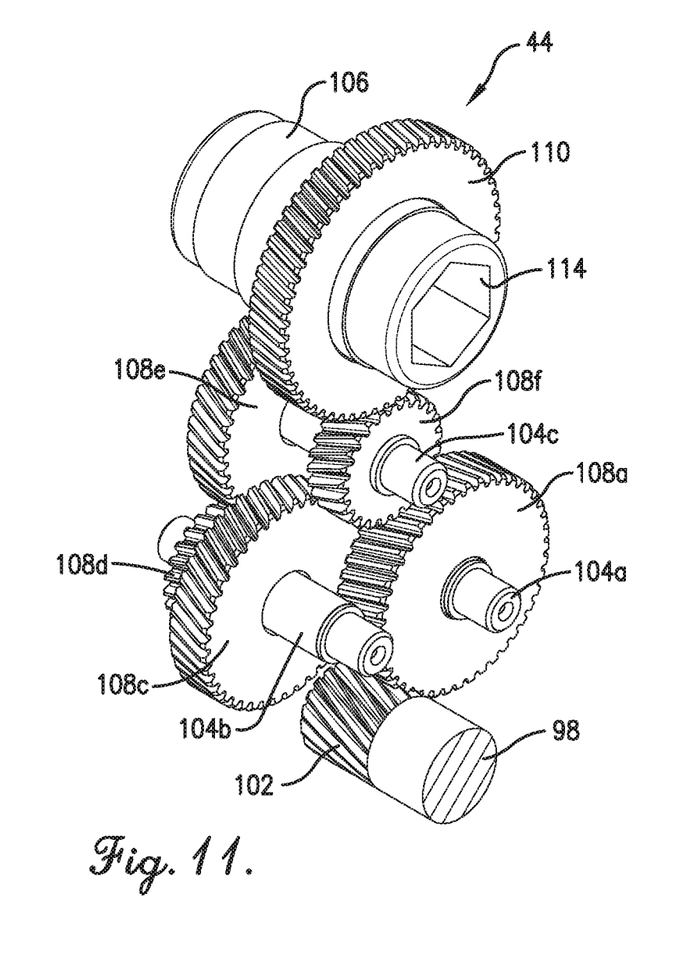
FIG. 11 is a fragmentary left side perspective of the gearmotor assembly shown in FIGS. 5-10.
Figure 12:
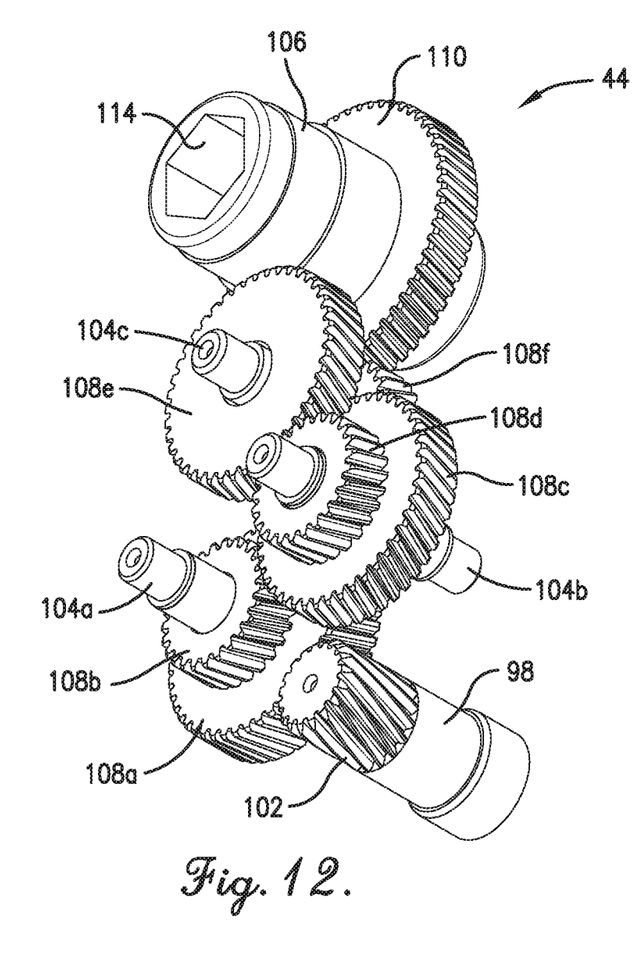
FIG. 12 is a fragmentary right side perspective of the gearmotor assembly similar to FIG. 11, but taken from the opposite side.

The train output shaft 106 defines the shaft axis A2, which is preferably axially offset from the motor axis A1 of the motor shaft 98 (see FIG. 10). Opposite ends of the train output shaft 106 are rotatably supported by a respective pair of bearings 112 (see FIGS. 5-7) that permit the train output shaft 106 and the driven gear 110 to spin freely within the case chamber 50. The bearings 112 are mounted in respective bearing pockets 62 of the inboard and outboard case sections 52,54 and are configured to also (partially) support the conveyor roller 22.

The three (3) train intermediate shafts 104*a*,*b*,*c* and the train intermediate gears 108*a-f* are configured for gear train operation to transmit power from the electric motor 42 to the train driven gear 110.

The train intermediate shafts 104 include a first train intermediate shaft 104*a*, a second train intermediate shaft 104*b*, and a third train intermediate shaft 104*c*. The train intermediate shafts 104*a*,*b*,*c* are each unitary and preferably receive and support respective train intermediate gears 108 for rotation therewith, as will be explained.

Opposite ends of the train intermediate shafts 104*a*,*b*,*c* are rotatably supported by respective pairs of bearings 112 (see FIGS. 5-7) that permit the train intermediate shafts 104 and the train intermediate gears 108 to spin freely within the case chamber 50. The bearings 112 are mounted in respective bearing pockets 62 of the inboard and outboard case sections 52,54.

Turning to FIGS. 9-12, the train intermediate shafts 104 are preferably axially offset from one another, from the train output shaft 106, and from the drive gear 102 of the motor shaft 98 so that the gears 102,108,110 cooperatively provide intermeshing pairs of gears.

In the depicted embodiment, the first train intermediate shaft 104*a* receives first and second train intermediate gears 108*a*,*b*, the second train intermediate shaft 104*b* receives third and fourth train intermediate gears 108*c*,*d*, and the third train intermediate shaft 104*c* receives fifth and sixth intermediate gears 108*e*,*f*.

The illustrated gear train 44 is preferably configured so that the drive gear 102 intermeshes with the first train intermediate gear 108*a*. The second train intermediate gear 108*b* intermeshes with the third train intermediate gear 108*c*. The fourth train intermediate gear 108*d* intermeshes with the fifth train intermediate gear 108*e*. The sixth train intermediate gear 108*f* intermeshes with the train driven gear 110 on the train output shaft 106.

Each pair of intermeshed gears preferably has a gear ratio that provides a speed reduction and a corresponding torque increase. For each pair of intermeshed gears, the gear ratio preferably ranges from about 1:1 to about 5:1. However, for certain aspects of the present invention, the gear ratio of one or more pairs of intermeshed gears could fall outside this range.

The pairs of intermeshed gears preferably cooperate to provide an overall gear ratio for the gearmotor assembly 26 that provides a speed reduction and a corresponding torque increase. The overall gear ratio preferably ranges from about 4:1 to about 30:1. However, for certain aspects of the present invention, the overall gear ratio could fall outside this range.

However, the principles of the present invention are equally applicable where the gear train 44 includes an alternative gear arrangement. For instance, one or more gears could be alternatively sized so that a corresponding pair of intermeshed gears has an alternative gear ratio.

It is also within the scope of the present invention where the gear train 44 has an alternative number of gears. For instance, one or more pairs of intermeshed gears could be removed from the gear train (e.g., to provide a relatively smaller overall gear ratio for the gearmotor assembly). Similarly, one or more pairs of intermeshed gears could be added to the gear train (e.g., to provide a relatively larger overall gear ratio for the gearmotor assembly). Also, for certain aspects of the invention, the gearmotor assembly could be devoid of intermediate gears (e.g., where the drive gear associated with the motor output shaft drivingly engages the driven gear associated with the output shaft of the gearmotor assembly).

Although the depicted gearmotor assembly 26 has a gear arrangement with a fixed gear ratio, alternative embodiments of the gear train could have one or more shiftable gears so that the gearmotor assembly has a gear transmission with an adjustable gear ratio.

The train bearings 112 preferably comprise ball bearings but could include other types of bearings (e.g., roller bearings or journal bearings) consistent with the principles of the present invention.

In use, the gear train 44 is drivingly interposed between the drive gear 102 of the electric motor 42 and the conveyor roller 22. As the electric motor 42 is powered to produce rotation of the drive gear 102, the gear train 44 transmits power from the motor shaft 98 to the conveyor roller 22 to cause rotation of the conveyor roller 22.

Turning to FIGS. 1-7, the gearmotor assembly 26 is preferably removably attached to the inboard wall 30*c* of the conveyor side rail 24*a*. In the depicted embodiment, the gearmotor housing 40 is preferably mounted so that the outboard surface 72*b* engages the inboard wall 30*c*. The gearmotor housing 40 is preferably positioned so that the inboard and outboard case sections 52,54 are proximal and distal to the conveyor roller 22, respectively.

The outboard case section 54 preferably provides an integral case connection structure 66 that is removably attached to the conveyor side rail 24*a* by mounting fasteners 58. Again, the case connection structure 66 preferably includes internally threaded fastener bosses 68 and locating bosses 70.

The gearmotor assembly 26 is positioned for attachment to the conveyor side rail 24*a* by engaging the outboard surface 72*b*, which is presented by the outboard case section 54, with the inboard wall 30*c*. The locating bosses 70 are preferably located in respective side openings 34 of the inboard wall 30c to position the outboard case section 54 vertically and horizontally relative to the conveyor side rail 24a in a desired location.

The gearmotor assembly 26 is secured in the desired position by extending the mounting fasteners 58 through side openings 34 and threading the mounting fasteners 58 into the mounting bosses 68. Thus, the conveyor side rail 24a supports the gearmotor assembly 26, and the roller shaft 38a is supported on the conveyor side rail 24a by the gearmotor assembly 26.

Although the disclosed structure for attaching the gearmotor assembly 26 to the conveyor side rail 24a is preferred, the gearmotor assembly 26 could be attached to the conveyor side rail 24a with an alternative connection structure, according to certain aspects of the present invention. For instance, the gearmotor assembly could have other types of threaded fasteners (e.g., bolts, nuts, screws, etc.) for securement relative to the conveyor side rail.

It will also be appreciated that various connection devices could be used to provide either removable attachment or permanent attachment of the gearmotor assembly to the conveyor side rail. For example, in alternative embodiments, a removable connection device may include an adjustable clamp, hook, strap, etc. that frictionally engages the conveyor side rail.

In the depicted embodiment, the gearmotor assembly 26 is positioned inboard of the conveyor side rail 24a. However, it is also within the ambit of the present invention where the gearmotor assembly is alternatively positioned relative to the conveyor side rail. For certain aspects of the present invention, the gearmotor assembly could be located only partly inboard of the conveyor side rail (e.g., where at least part of the gearmotor assembly is located within the channel of the conveyor side rail). For certain aspects of the present invention, the gearmotor assembly could be located at least partly outboard, or even entirely outboard, of the conveyor side rail.

Again, the gearmotor assembly 26 is configured to drive a respective conveyor roller 22. For certain aspects of the present invention, the gearmotor assembly 26 could be configured to power multiple conveyor rollers. In such alternative embodiments, for example, the gearmotor assembly could be provided with multiple train output shafts connected to respective conveyor rollers.

Operation

In operation, the conveyor system 20 is operable to advance items (e.g., packages) along the longitudinal path P by driving one or more conveyor rollers 22 of the conveyor system 20. In the depicted embodiment, the conveyor roller 22 is operably attached to and powered by a gearmotor assembly 26. Again, the electric motor 42 of the gearmotor assembly 26 is operably coupled to a power supply (not shown). The electric motor 42 is selectively powered to rotate the shaft 98 and the drive gear 102 and to thereby power the gear train 44 and the conveyor roller 22.

As explained above, the gear train 44 is drivingly interposed between the drive gear 102 of the electric motor 42 and the conveyor roller 22. As the electric motor 42 is powered to produce rotation of the drive gear 102, the gear train 44 transmits power from the motor shaft 98 to the conveyor roller 22 to cause rotation of the conveyor roller 22. The gear train 44 provides a gear ratio that preferably causes a corresponding speed reduction and a corresponding torque increase.

Again, while only one conveyor roller 22 is depicted as being powered by the gearmotor assembly 26, it will be understood that the conveyor system 20 includes multiple conveyor rollers 22 spaced along the longitudinal path P that are selectively powered by corresponding gearmotor assemblies 26.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A gearmotor assembly for use with a conveyor system having a rotatable conveyor roller extending laterally between spaced conveyor side rails, said gearmotor assembly comprising:
   an electric motor with a rotatable motor output shaft;
   a gear train drivingly connected to the motor output shaft, said gear train including a train output shaft axially offset from the motor output shaft, with the train output shaft being drivingly connectable to the conveyor roller, so that rotation of the motor output shaft produces corresponding rotation of the conveyor roller; and
   a gearmotor housing that contains the electric motor and gear train,
   said gearmotor housing including an enclosed gear train case that presents a chamber to operably receive the gear train,
   said gear train case including removably attached first and second case sections that cooperatively define the chamber, with the first and second case sections configured to be, respectively, proximal and distal to the conveyor roller.

2. The gearmotor assembly as claimed in claim 1,
   said electric motor being supported by the gearmotor housing on the first case section, with the gearmotor housing configured to receive the conveyor roller adjacent the electric motor so that the conveyor roller and electric motor extend alongside one another away from the first case section.

3. The gearmotor assembly as claimed in claim 2,
   said gearmotor housing including a motor housing removably attached to the gear train case.

4. The gearmotor assembly as claimed in claim 1,
   said second case section providing a case connection structure configured to be removably attached to one of the conveyor side rails.

5. The gearmotor assembly as claimed in claim 4,
   said case connection structure including threaded fastener elements, said gear train case including fasteners that threadably engage the threaded fastener elements to removably attach the case connection structure to the one conveyor side rail.

6. The gearmotor assembly as claimed in claim 1,
said gear train including first and second bearings mounted in the first and second case sections, respectively, said train output shaft being rotatably supported by the first and second bearings.

7. The gearmotor assembly as claimed in claim 1,
said motor output shaft being associated with a drive gear and said train output shaft being associated with a driven gear, said gear train including an intermediate gear that drivingly interconnects the drive gear and the driven gear.

8. The gearmotor assembly as claimed in claim 7,
said gear train including first and second bearings mounted in the first and second case sections, respectively, said intermediate gear being rotatably supported by the first and second bearings.

9. A conveyor system configured to advance an item along a longitudinal path, said conveyor system comprising:
a pair of spaced conveyor side rails extending along opposite sides of the longitudinal path;
a conveyor roller extending laterally between the conveyor side rails to support the item during advancement; and
a gearmotor assembly including an electric motor with a rotatable motor output shaft,
said gearmotor assembly also including a gear train drivingly connected to the motor output shaft,
said gear train including a train output shaft axially offset from the motor output shaft, with the train output shaft being drivingly connected to the conveyor roller, so that rotation of the motor output shaft produces corresponding rotation of the conveyor roller,
said gearmotor assembly including a gearmotor housing,
said conveyor roller including a roller drive shaft,
said roller drive shaft extending into the gearmotor housing,
said train output shaft presenting an opening that slidably receives the roller drive shaft, with the opening and the roller drive shaft having complemental shapes.

10. A conveyor system configured to advance an item along a longitudinal path, said conveyor system comprising:
a pair of spaced conveyor side rails extending along opposite sides of the longitudinal path;
a conveyor roller extending laterally between the conveyor side rails to support the item during advancement; and
a gearmotor assembly including an electric motor with a rotatable motor output shaft,
said gearmotor assembly also including a gear train drivingly connected to the motor output shaft,
said gear train including a train output shaft axially offset from the motor output shaft, with the train output shaft being drivingly connected to the conveyor roller, so that rotation of the motor output shaft produces corresponding rotation of the conveyor roller,
said gearmotor assembly including a gearmotor housing that contains the electric motor and gear train,
said gearmotor housing including an enclosed gear train case that presents a chamber to operably receive the gear train.

11. The conveyor system as claimed in claim 10,
said conveyor side rails each including an inboard surface and an outboard surface, said gearmotor assembly being mounted on the inboard surface of one of the conveyor side rails.

12. The conveyor system as claimed in claim 11,
said gear train being positioned outboard relative to the electric motor and the conveyor roller and inboard relative to the one conveyor side rail.

13. The conveyor system as claimed in claim 10,
said gearmotor assembly including a gearmotor housing,
said conveyor roller including a roller drive shaft,
said roller drive shaft extending into the gearmotor housing.

14. The conveyor system as claimed in claim 10,
said gear train case including removably attached inboard and outboard case sections that cooperatively define the chamber, with the inboard and outboard case sections being, respectively, proximal and distal to the conveyor roller.

15. The conveyor system as claimed in claim 14,
said electric motor being supported by the gearmotor housing on the inboard case section, with the gearmotor housing receiving the conveyor roller adjacent the electric motor so that the conveyor roller and electric motor extend alongside one another away from the inboard case section.

16. The conveyor system as claimed in claim 14,
said conveyor side rails each including an inboard surface and an outboard surface, said gearmotor assembly being mounted on the inboard surface of one of the conveyor side rails,
said outboard case section providing a case connection structure removably attached to the one conveyor side rail.

17. The conveyor system as claimed in claim 16,
said case connection structure including threaded fastener elements,
said gear train case including fasteners that threadably engage the threaded fastener elements to removably attach the case connection structure to the one conveyor side rail.

* * * * *